(12) United States Patent
Mitton

(10) Patent No.: US 8,220,419 B2
(45) Date of Patent: Jul. 17, 2012

(54) RADIALLY ADJUSTABLE HORSE GRAZING MUZZLE

(76) Inventor: James Owen Mitton, New Holland, PA (US)

( * ) Notice: Subject to any disclaimer, the term of this patent is extended or adjusted under 35 U.S.C. 154(b) by 57 days.

(21) Appl. No.: 12/658,245

(22) Filed: Feb. 4, 2010

(65) Prior Publication Data
US 2011/0185981 A1     Aug. 4, 2011

(51) Int. Cl.
*A01K 25/00*     (2006.01)
(52) U.S. Cl. .......................... 119/832; 54/80.3
(58) Field of Classification Search ................... 119/712, 119/814, 821, 831, 832, 863; 54/80.1, 80.3, 54/80.5, 80.4; *A01K 37/00, 15/04; A62B 35/00; A42B 01/18*
See application file for complete search history.

(56) References Cited

U.S. PATENT DOCUMENTS

| | | | | |
|---|---|---|---|---|
| 522,696 A | * | 7/1894 | Sanborn | 119/832 |
| 691,097 A | * | 1/1902 | Bark | 119/832 |
| 1,082,372 A | * | 12/1913 | Thompson | 119/831 |
| 1,773,774 A | * | 8/1930 | Carr | 119/832 |
| 3,126,869 A | * | 3/1964 | Etal | 119/712 |
| 3,491,755 A | * | 1/1970 | Barghini et al. | 128/201.13 |
| 4,273,119 A | * | 6/1981 | Marchello | 128/201.13 |
| 4,603,659 A | * | 8/1986 | Helphrey | 119/831 |
| 5,218,929 A | * | 6/1993 | Michunovich | 119/832 |

* cited by examiner

*Primary Examiner* — Rob Swiatek
*Assistant Examiner* — Thien Thanh Pham
(74) *Attorney, Agent, or Firm* — Charles E. Baxley

(57) ABSTRACT

A radially adjustable horse grazing muzzle includes a muzzle body made of a flexible material and having an open end for allowing a horse snout to be placed in the muzzle body therethrough, and an adjustment assembly configured as a segment of a periphery of the open end of the muzzle body and having a pad and at least one adjustable fastener composed a first member and a second member, wherein the first member is fixed to the pad while the second member is fixed to an adjacent segment of the periphery of the open end of the muzzle body, the first and second members being configured to combine with an adjustable overall length thereof, whereby when the overall length of the combined first member and second member is reduced, the muzzle body is centripetally converged, thereby achieving a radial adjustment of the muzzle.

4 Claims, 4 Drawing Sheets

RADIALLY ADJUSTABLE HORSE GRAZING MUZZLE

BACKGROUND OF THE INVENTION

1. Technical Field

The present invention relates to horse grazing muzzles, and more particularly, to a radially adjustable horse grazing muzzle featuring for a novel adjustment assembly provided thereon.

2. Description of Related Art

Horse grazing muzzles have been popularly utilized for protecting horses against improper ingestion of grass yet allowing them to drink freely. As shown in FIG. 1, a conventional muzzle 90 made of a flexible material is configured to be attached to a halter 80 that matches a horse head by means of at least a pair of cheek bands 83, a crown band 85, and a throat band 87, so that when the halter 80 is put onto a horse head, the muzzle 90 is positioned around the horse snout.

Said muzzle 90 typically comes with an average size to fit a general horse snout. While an unduly large muzzle can bother the horse wearing it with sway and impact, and unduly small muzzle may injure the horse skin because of constriction. However, though said head halter 80 is usually imparted with adjustability to fit the length of the horse head, there is no design for the muzzle 90 to be radically adjusted. Therefore, the clearance between the horse snout and the muzzle 90 may cause the muzzle 90 to continually rub against the horse skin or cause the muzzle 90 to tip and come off the snout.

SUMMARY OF THE INVENTION

In view of the shortcomings of the existing muzzles as described above, one objective of the present invention is to provide a radially adjustable horse grazing muzzle, wherein an adjustment assembly adapts the muzzle to a snout of a horse wearing said muzzle.

According to the present invention, the radially adjustable horse grazing muzzle includes a muzzle body and an adjustment assembly. The muzzle body is made of a flexible material and has an open end for allowing a horse snout to be placed in the muzzle body therethrough. The adjustment assembly configured as a segment of a periphery of the open end of the muzzle body. The adjustment assembly comprises a pad and at least one adjustable fastener. Each said adjustable fastener has a first member and a second member, wherein the first member is fixed to the pad while the second member is fixed to an adjacent segment of the periphery of the open end of the muzzle body. The first and second members are configured to such combine with each other that an overall length of the combined first member and second member is adjustable. Thereby, when the overall length of the combined first member and second member is reduced, the periphery of the open end of the muzzle body is centripetally converged so as to achieve a radial adjustment of the muzzle.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawing, wherein.

DETAILED DESCRIPTION OF THE INVENTION

While a preferred embodiment will be described hereinafter for illustrating the concept of the present invention as described above, it is to be understood that the components of the embodiment shown in the accompanying drawings are depicted for the sake of easy explanation and need not to be made in scale. Besides, counterparts through the drawings are denoted by the same numerals.

Figure 1:
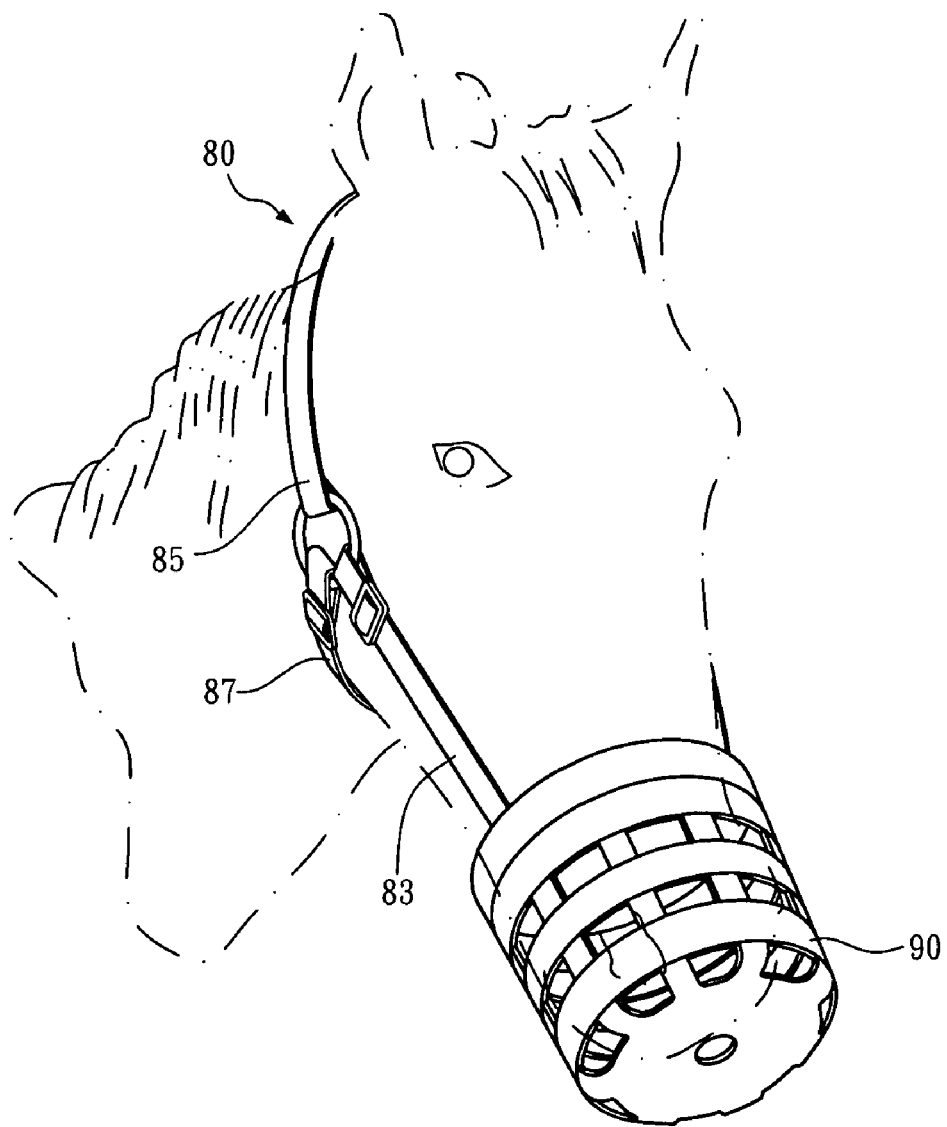
FIG. 1 is a schematic drawing showing a conventional horse grazing muzzle put on a horse snout.
Figure 2:
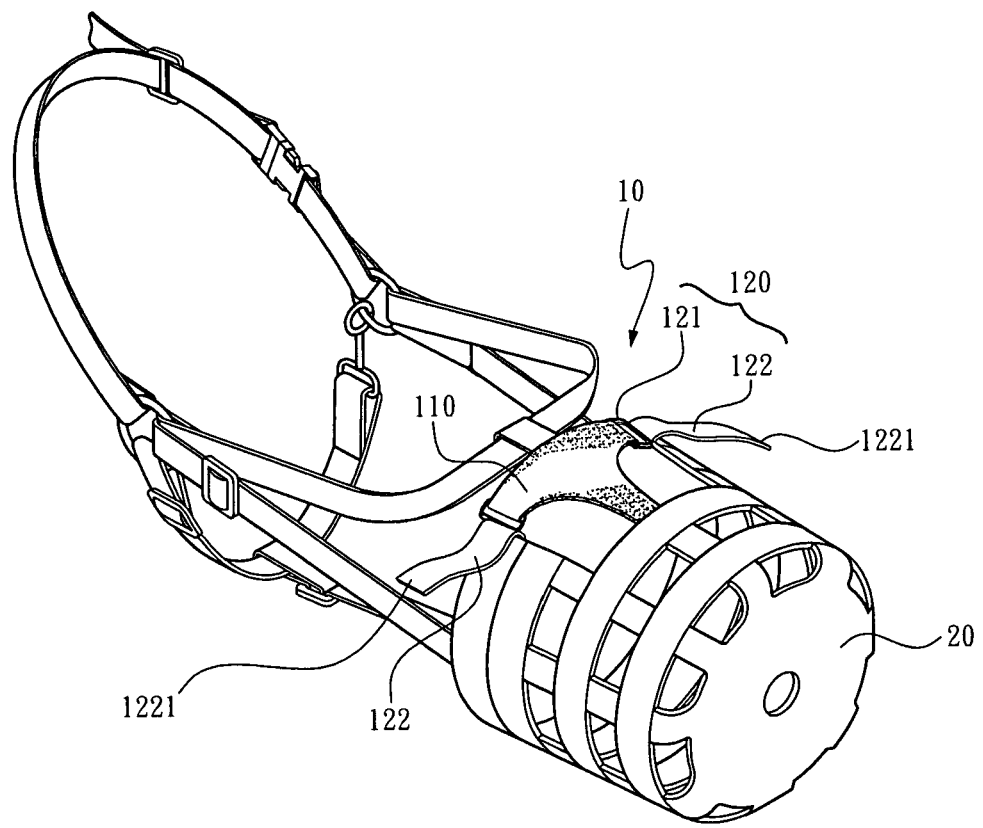
FIG. 2 is a perspective view of a radially adjustable horse grazing muzzle according to one embodiment of the present invention, wherein adjustable fasteners of an adjustment assembly on the muzzle are now unfastened.
Figure 3:
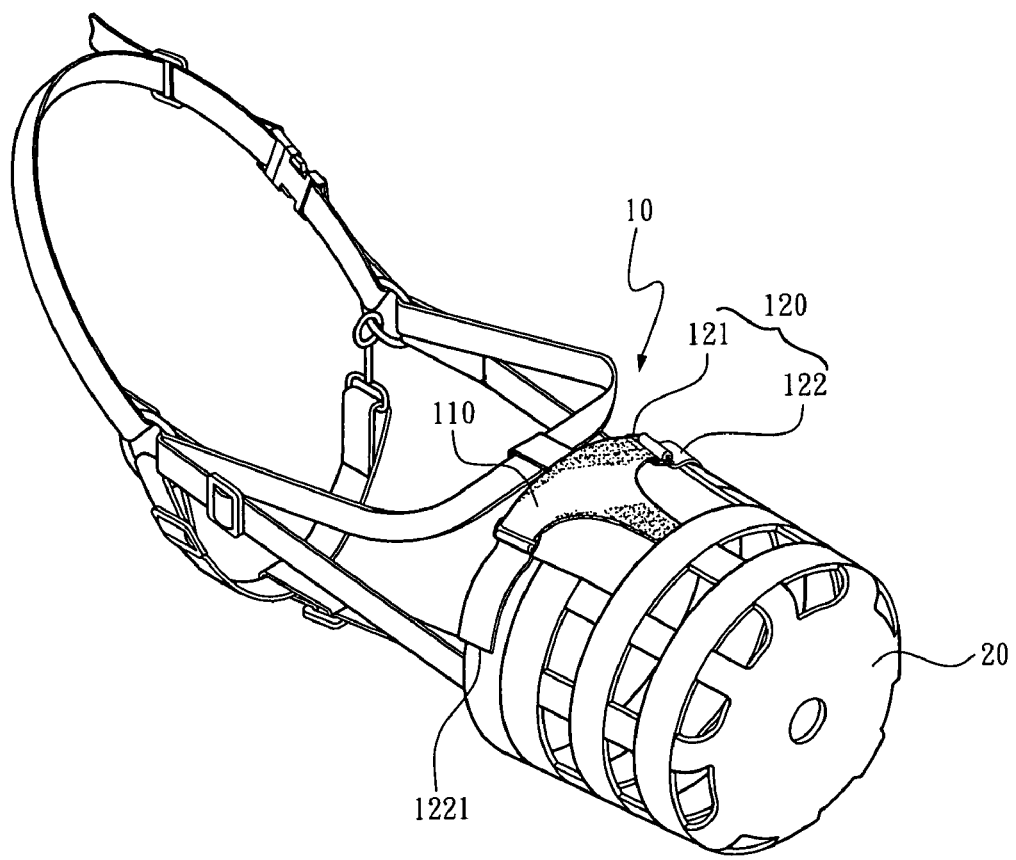
FIG. 3 is another perspective view of the radially adjustable horse grazing muzzle of the present invention, wherein the adjustable fasteners are now fastened.
Figure 4:
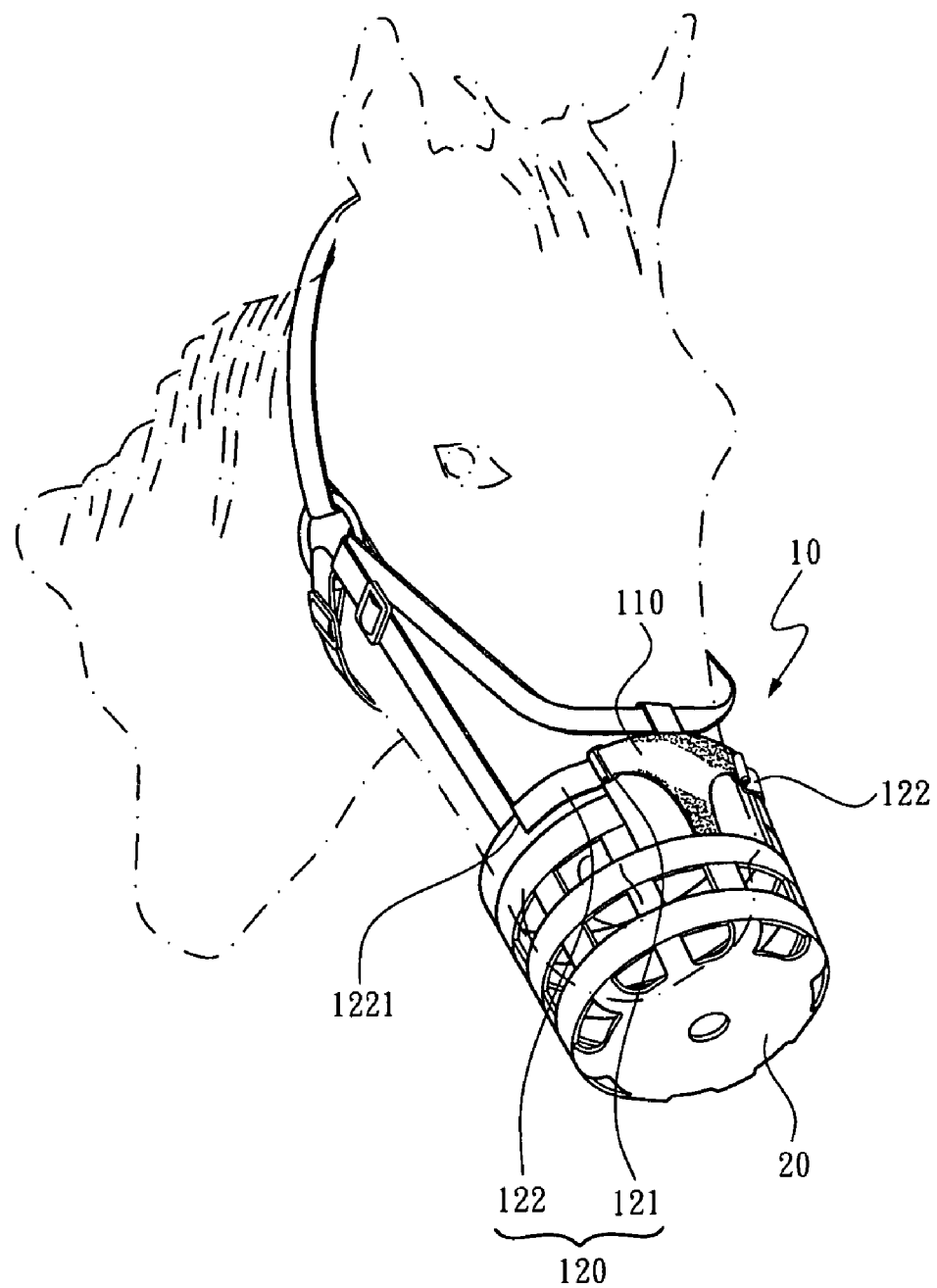
FIG. 4 is a schematic drawing showing the radially adjustable horse grazing muzzle of the present invention fitted on a horse snout.

A radially adjustable horse grazing muzzle, referring to FIGS. 2 and 3, includes a muzzle body 20 that is made of a flexible material and has an open end for allowing a horse snout to be placed in the muzzle body 20 therethrough. An adjustment assembly 10 is configured as a segment of a periphery of the open end of the muzzle body 20. The adjustment assembly primarily comprises a pad 110 and at least one adjustable fastener 120. In the present embodiment, the adjustment assembly 10 is composed of the pad and two said adjustable fasteners 120 that flank the pad 110. The pad has an inner surface made of a soft yet wearable material for tenderly abutting on the horse snout.

Each of the two said adjustable fasteners 120 has a first member 121 and a second member 122 wherein the first member 121 is fixed to the pad 110 while the second member 122 is fixed to an adjacent segment of the periphery of the open end of the muzzle body 20. Said first member 121 and second member 122 are fixed to the pad 110 and the periphery of the open end of the muzzle body 20 by means of, for example, sewing. The first and second members 121, 122 are configured to such combine with each other that an overall length of the combined first member 121 and second member 122 is adjustable.

In the present embodiment, the first member 121 is a fixing ring 121 adjacent to the second member 122 while the second member 122 is a strip with distal end formed as a free end 1221. Thereupon, a user may make the free end 1221 of the second member 122 pass through the fixing ring 121 and fasten the second member 122 to the fixing ring 121 at will.

As described before, the muzzle body 20 is typically made of the flexible material. Thus, when either or both of the adjustable fasteners 120 are adjusted to present a relatively short overall length, the entire length of the periphery of the open end of the muzzle body 20 is in turn reduced and thus the periphery of the open end of the muzzle body 20 is centripetally converged, thereby achieving a radial adjustment of the muzzle 20.

By using the disclosed adjustment assembly 10, the muzzle body 20 can be radically adjusted to perfectly fit a horse snout and facilitates precluding a rub against the horse skin or a slant of the muzzle body 20.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A radially adjustable horse grazing muzzle, comprising:
a muzzle body made of a flexible material and having an open end for allowing a horse snout to be placed in the muzzle body therethrough; and
an adjustment assembly configured as a segment of a periphery of the open end of the muzzle body and comprising:
a pad; and
at least one adjustable fastener, each having
a first member; and
a second member,
wherein the first member is fixed to the pad while the second member is fixed to an adjacent segment of the periphery of the open end of the muzzle body, the first and second members being configured so as to combine with each other such that an overall length of the combined first member and second member is adjustable,
whereby when the overall length of the combined first member and second member is reduced, a circumference of the periphery of the open end of the muzzle body is reduced, achieving a radial adjustment of the muzzle, wherein the first member is a fixing ring adjacent to the second member while the second member is a strip with a distal end formed as a free end so that the free end of the second member is allowed to pass through the fixing ring and couple with the fixing ring.

2. The radially adjustable horse grazing muzzle as claimed in claim 1, wherein the pad has an inner surface made of a soft yet wearable material for tenderly abutting on the horse snout.

3. The radially adjustable horse grazing muzzle as claimed in claim 1, wherein the adjustment assembly is composed of the pad and two said adjustable fasteners that flank the pad.

4. The radially adjustable horse grazing muzzle as claimed in claim 1, wherein said first member and second member are fixed to the pad and the periphery of the open end of the muzzle body by means of sewing.

* * * * *